US009528659B2

(12) United States Patent
Manser et al.

(10) Patent No.: US 9,528,659 B2
(45) Date of Patent: Dec. 27, 2016

(54) PLASTIC STAND AND METHOD OF ATTACHMENT TO A PRESSURE VESSEL

(75) Inventors: Roger Manser, Uxbridge, MA (US); Christopher A. Van Haaren, Warwick, RI (US)

(73) Assignee: AMTROL Licensing Inc., West Warwick, RI (US)

( * ) Notice: Subject to any disclaimer, the term of this patent is extended or adjusted under 35 U.S.C. 154(b) by 735 days.

(21) Appl. No.: 14/124,050

(22) PCT Filed: Oct. 3, 2011

(86) PCT No.: PCT/US2011/054624
§ 371 (c)(1),
(2), (4) Date: May 6, 2014

(87) PCT Pub. No.: WO2012/047807
PCT Pub. Date: Apr. 12, 2012

(65) Prior Publication Data
US 2014/0231439 A1    Aug. 21, 2014

Related U.S. Application Data

(60) Provisional application No. 61/389,580, filed on Oct. 4, 2010.

(51) Int. Cl.
*F17C 13/08* (2006.01)
*F16M 11/04* (2006.01)

(52) U.S. Cl.
CPC ............. *F17C 13/084* (2013.01); *F16M 11/04* (2013.01); *F17C 13/083* (2013.01);
(Continued)

(58) Field of Classification Search
CPC . F17C 13/084; F17C 13/083; F17C 2201/032; F17C 2201/0109; F17C 2205/0126; F17C 2205/018; F16M 11/04; B65D 90/12
(Continued)

(56) References Cited

U.S. PATENT DOCUMENTS 882,378 A * 3/1908 Friendlich ............ A61N 1/0448
215/376
2,067,581 A * 1/1937 Smith .................. F17C 13/084
220/605
(Continued)

FOREIGN PATENT DOCUMENTS

WO    2006082235 A1    8/2006
WO    2009137812 A2    11/2009

OTHER PUBLICATIONS

International Search Report and Written Opinon for International Patent Application No. PCT/US2011/054624 dated Apr. 24, 2012.

*Primary Examiner* — Robert J Hicks
*Assistant Examiner* — Kareen Thomas
(74) *Attorney, Agent, or Firm* — Locke Lord LLP; Scott D. Wofsy; Joshua L. Jones

(57) ABSTRACT

A stand for supporting a pressure vessel includes a support body having an upper wall and a sidewall extending downwardly from the upper wall. A locking aperture is defined in the upper wall to permit passage of pressure vessel components therethrough. A plurality of locking latches is disposed along an inner dimension of the locking aperture. The locking latches are configured and adapted to couple with a pressure vessel retaining ring passing through the locking aperture.

20 Claims, 11 Drawing Sheets

(52) U.S. Cl.
CPC .... *F17C 2201/0109* (2013.01); *F17C 2201/032* (2013.01); *F17C 2205/018* (2013.01); *F17C 2205/0126* (2013.01)

(58) Field of Classification Search
USPC ........ 220/630, 586, 628, 519, 523; 248/127, 248/146, 154, 188, 176.1; D23/206
See application file for complete search history.

(56) References Cited

U.S. PATENT DOCUMENTS

| | | | | |
|---|---|---|---|---|
| 2,086,404 A * | 7/1937 | Daniels | A47G 19/2255 | 215/332 |
| 2,309,854 A * | 2/1943 | MacSporran | F17C 7/04 | 137/322 |
| 2,526,708 A * | 10/1950 | Sundholm | F16N 37/02 | 141/360 |
| 2,899,153 A * | 8/1959 | Parker | A47C 21/00 | 211/74 |
| 2,905,351 A * | 9/1959 | Lerner | A47G 23/0216 | 215/372 |
| 2,925,192 A * | 2/1960 | Herrman | F16M 5/00 | 220/630 |
| 2,973,233 A * | 2/1961 | McPhee | F16B 12/48 | 248/188 |
| 2,997,199 A * | 8/1961 | Ramon | A24F 19/00 | 220/23.86 |
| 3,000,532 A * | 9/1961 | Miklich | A47G 23/08 | 211/74 |
| 3,028,702 A * | 4/1962 | St Cyr | A47G 23/0216 | 215/395 |
| 3,236,389 A * | 2/1966 | Murdock | A21B 3/00 | 108/101 |
| 3,545,641 A * | 12/1970 | Olson | B65D 88/10 | 206/511 |
| 3,616,032 A * | 10/1971 | Kugler | B01J 3/04 | 156/286 |
| 3,677,021 A * | 7/1972 | Bognaes | B63B 25/12 | 114/74 A |
| 3,809,353 A * | 5/1974 | Good | B63C 11/22 | 248/346.11 |
| 3,929,312 A * | 12/1975 | Uke | B63C 11/22 | 248/346.11 |
| 3,965,616 A * | 6/1976 | Ridgeway | A01G 9/04 | 206/423 |
| 3,981,099 A * | 9/1976 | Dziewulski | A01G 9/02 | 220/630 |
| 3,990,179 A * | 11/1976 | Johnson | A01G 9/02 | 206/423 |
| 4,022,343 A * | 5/1977 | Richardson | B65D 59/06 | 206/521 |
| 4,022,345 A * | 5/1977 | Butz | B65D 1/48 | 220/630 |
| 4,047,329 A * | 9/1977 | Holt | A01G 9/04 | 220/212 |
| 4,127,211 A * | 11/1978 | Zerbey | B65D 51/04 | 215/376 |
| 4,331,246 A * | 5/1982 | Sorensen | B65D 23/001 | 215/12.1 |
| 4,344,645 A * | 8/1982 | Kirk | B65D 90/12 | 220/630 |
| 4,461,271 A * | 7/1984 | Juang | F17C 13/084 | 126/38 |
| 4,489,846 A * | 12/1984 | Nickel | B65D 90/12 | 220/632 |
| 4,494,666 A * | 1/1985 | Cooper | F17C 13/123 | 220/327 |
| 4,545,759 A * | 10/1985 | Giles | F17C 13/04 | 126/40 |
| 4,907,712 A * | 3/1990 | Stempin | F17C 13/084 | 220/630 |
| 4,919,375 A * | 4/1990 | Miller | F16M 13/00 | 248/152 |
| 4,919,381 A * | 4/1990 | Buist | A47G 23/0216 | 220/738 |
| 4,932,621 A * | 6/1990 | Kowk | F16M 13/00 | 248/146 |
| 5,074,421 A * | 12/1991 | Coulter | F17C 13/084 | 211/163 |
| 5,172,457 A * | 12/1992 | Allen | A61G 17/08 | 248/146 |
| 5,232,120 A * | 8/1993 | Dunken | B65D 1/20 | 206/508 |
| 5,261,559 A * | 11/1993 | Salvucci, Sr. | F17C 13/085 | 137/382 |
| 5,335,954 A * | 8/1994 | Holub | A45F 5/10 | 215/376 |
| 5,388,720 A * | 2/1995 | Murphy | F17C 13/002 | 138/30 |
| 5,501,363 A * | 3/1996 | Muller | A47G 19/2227 | 181/177 |
| 5,597,085 A * | 1/1997 | Rauworth | B65D 11/06 | 220/23.83 |
| 5,709,252 A * | 1/1998 | Princiotta | B60P 3/055 | 108/55.3 |
| 5,813,643 A * | 9/1998 | Zybert | F17C 13/084 | 248/154 |
| 5,836,105 A * | 11/1998 | Loosen | A47G 7/025 | 248/154 |
| 5,862,938 A * | 1/1999 | Burkett | F17C 13/084 | 220/589 |
| 5,918,849 A * | 7/1999 | Bliss | A47G 33/1213 | 192/223.1 |
| 6,041,618 A | 3/2000 | Patel et al. | | |
| 6,318,683 B1 * | 11/2001 | Savoy | A47D 1/008 | 248/146 |
| 6,386,384 B1 * | 5/2002 | Chohfi | F17C 13/06 | 206/0.6 |
| 6,439,418 B1 * | 8/2002 | Immerman | B65D 25/24 | 220/626 |
| 6,572,069 B1 * | 6/2003 | Kotthaus | A47G 33/12 | 248/521 |
| D523,518 S * | 6/2006 | Moldenhauer | D23/206 | |
| 7,131,618 B2 | 11/2006 | Berry et al. | | |
| 7,726,620 B1 * | 6/2010 | Kleespie | F17C 13/002 | 220/571 |
| 7,753,046 B2 * | 7/2010 | Bruno | A47J 37/0786 | 126/25 R |
| D658,267 S | 4/2012 | Brockington et al. | | |
| 2002/0150746 A1 * | 10/2002 | Ono | C08L 81/02 | 428/292.1 |
| 2002/0162923 A1 * | 11/2002 | Geddes | F24C 15/36 | 248/176.1 |
| 2003/0141421 A1 * | 7/2003 | Kelley | B65D 25/24 | 248/146 |
| 2004/0016855 A1 | 1/2004 | Berry et al. | | |
| 2004/0069791 A1 * | 4/2004 | Neal | B44D 3/12 | 220/630 |
| 2004/0200753 A1 * | 10/2004 | Beekman | B29C 65/02 | 206/509 |
| 2006/0277783 A1 * | 12/2006 | Garton | B65D 90/12 | 34/165 |
| 2007/0045355 A1 * | 3/2007 | Claussen | B65D 88/10 | 222/425 |
| 2007/0068957 A1 * | 3/2007 | Oliveira | F17C 13/00 | 220/586 |
| 2011/0049167 A1 * | 3/2011 | Martin | B65D 23/001 | 220/630 |
| 2011/0140412 A1 * | 6/2011 | Manser | F17C 13/084 | 285/192 |

* cited by examiner

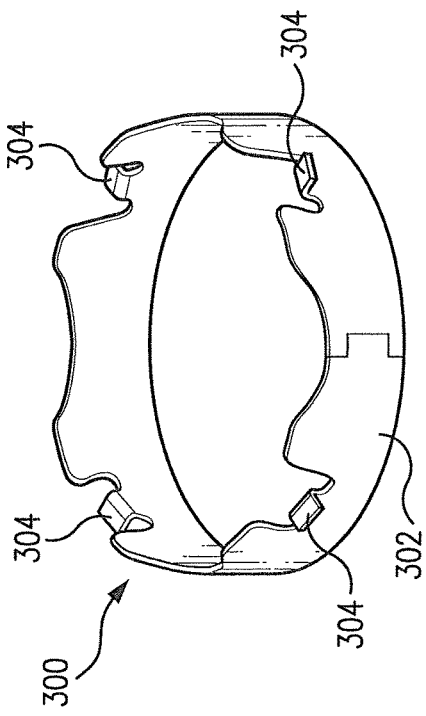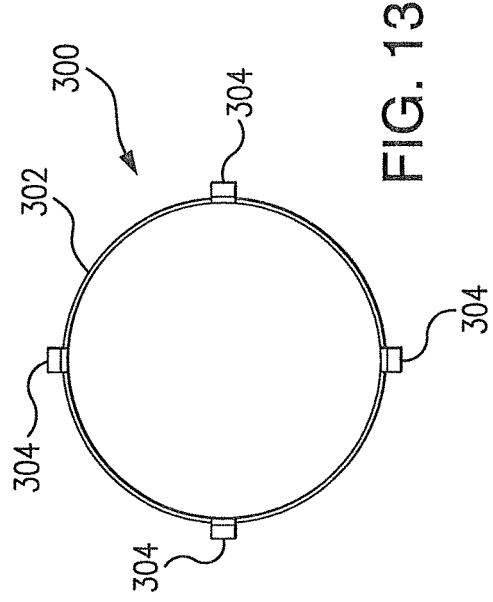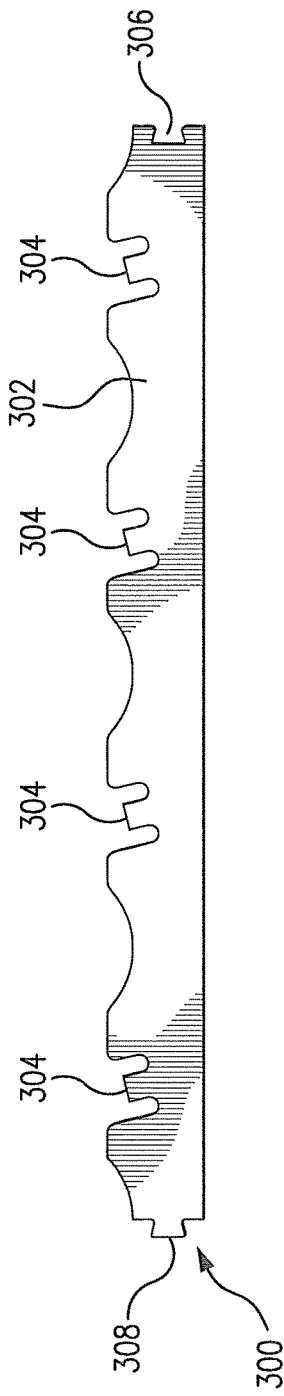

PLASTIC STAND AND METHOD OF ATTACHMENT TO A PRESSURE VESSEL

CROSS REFERENCE TO RELATED APPLICATIONS

This application is a U.S. National Stage Application based on International Application No. PCT/US2011/054624 filed Oct. 3, 2011 which claims priority to U.S. Provisional Patent Application No. 61/389,580 filed Oct. 4, 2010, the disclosures of which are incorporated herein by reference in their entireties.

BACKGROUND OF THE INVENTION

1. Field of the Invention

The present invention relates to support stands for a pressure vessel, and more particularly to support stands which can be lockingly coupled to a pressure vessel.

2. Description of Related Art

Many traditional pressure vessels are constructed with a metal stand welded to one end of the vessel to mount the pressure vessel in a desired location. However, due to exposure to weather, standing water and other elements, corrosion of the metal stand can occur, and over time such metal stands can ultimately fail.

Such conventional methods and systems have generally been considered satisfactory for their intended purpose. However, there is still an need in the art for a support stand that allows for improved resistance to corrosion while supporting a metal pressure vessel. There also remains a need in the art for such a support stand that is easy to make and use. The present invention provides a solution for these problems.

SUMMARY OF THE INVENTION

The subject invention is directed to a new and useful stand for supporting a pressure vessel. The stand includes a support body having an upper wall and a sidewall extending downwardly from the upper wall. A locking aperture is defined in the upper wall to permit passage of pressure vessel components therethrough. A plurality of locking latches is disposed along an inner dimension of the locking aperture. The locking latches are configured and adapted to couple with a pressure vessel retaining ring passing through the locking aperture.

In certain embodiments, the upper wall of the stand further includes a plurality of drainage apertures defined therethrough. The drainage apertures are configured and adapted to permit airflow and drainage through the upper wall of the stand. At least one access aperture can be defined in the sidewall of the stand, to permit a fluid conduit to pass therethrough. The stand can include a lower wall extending outward from a lower end of the sidewall, to present a flat contact surface with the ground to prevent sinking of the stand.

It is also contemplated that a plurality of stiffening ribs can be disposed within the support body below the upper wall and inboard of the sidewall, radiating outwardly from the locking aperture for improving resistance of the support body to applied forces. The sidewall of the support body can be configured with circumferential periodic concave recesses for enhancing rigidity of the support body. An upper portion of the sidewall can include an outer circumferential recess for engaging a pressure vessel base.

The invention also provides a pressure vessel including a vessel body defining an interior space for containing fluid and a retaining ring mounted to the vessel body. The pressure vessel also includes a stand as described above. The support body can be removable from the retaining ring by overcoming a predetermined locking preload force. It is also contemplated that when the stand is engaged with the pressure vessel retaining ring, the upper wall of the stand can bias against the vessel body and in turn bias the retaining ring tabs against the locking latches for locking the support body in place. The upper wall of the support body can be configured and adapted to bias the locking latches in a locked position when engaged with a pressure vessel retaining ring.

In certain embodiments, the retaining ring has a plurality of tabs extending radially outward to engage with a corresponding locking latch. The locking latches each can be adapted to rotatably engage a respective radially outward extending tab of the retaining ring.

It is also contemplated that each retaining ring tab can be locked in a detent in a respective locking latch. At least one of the locking latches can further include a plurality of locking detents to lockingly couple the support body to pressure vessels of multiple different shapes. The lower surface of each locking latch can be helical for engaging the pressure vessel by twisting. Each of the locking latches can be arcuately shaped.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 13 is a top plan view of an exemplary embodiment of a retaining ring constructed in accordance with the present invention, showing the retaining ring tabs for engaging the locking latches;

FIG. 14 is a perspective view of the retaining ring of FIG. 13, showing the retaining ring tabs and body;

FIG. 15 is a plan view of a blank for the retaining ring of FIG. 13, showing the retaining ring construction before being formed into a ring and prior to attachment to a pressure vessel;

DETAILED DESCRIPTION OF THE PREFERRED EMBODIMENTS

Figure 1:
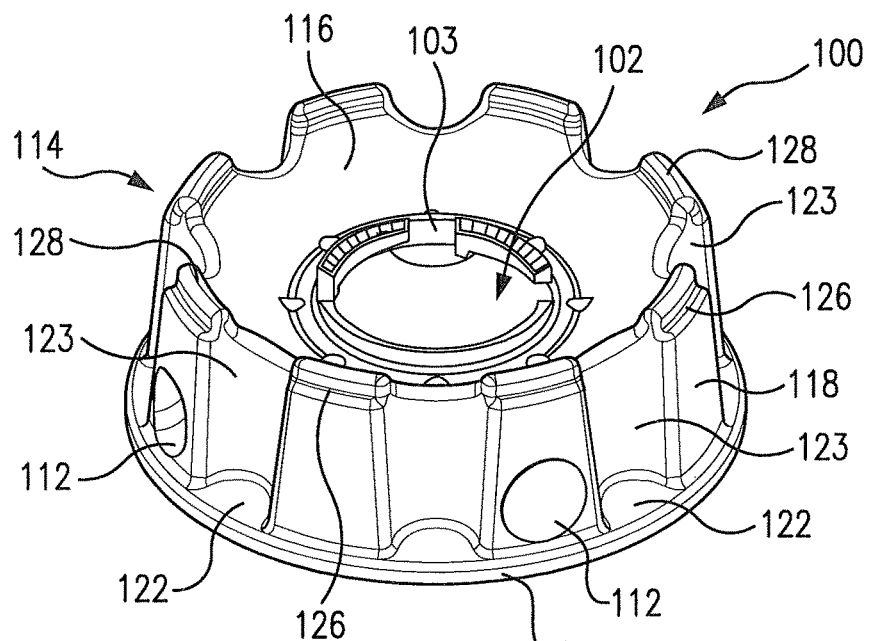
FIG. 1 is a perspective view of an exemplary embodiment of a support stand constructed in accordance with the present invention, showing the locking latches.

Reference will now be made to the drawings wherein like reference numerals identify similar structural features or aspects of the subject invention. For purposes of explanation and illustration, and not limitation, a partial view of an exemplary embodiment of a support stand in accordance with the invention is shown in FIG. 1 and is designated generally by reference character 100. Other embodiments of support stands in accordance with the invention, or aspects thereof, are provided in FIGS. 2-17, as will be described. The systems and methods of the invention can be used to connect a support stand to a desired pressure vessel of one or multiple different shapes while also being simple to manufacture and install.

Referring to FIG. 1, support stand 100 includes support body 114 having upper wall 116 and sidewall 118 extending downwardly from upper wall 116. Support stand 100 is formed of a corrosion-resistant material, such as a polymeric or composite material. Further, support stand 100 is made by a molding process, such as by injection molding, or any other suitable process. Locking aperture 102 is defined in upper wall 116 to permit passage of pressure vessel components therethrough. Access apertures 112 are defined in sidewall 118 of support stand 100 to permit a fluid conduit to pass therethrough.

Figure 2:
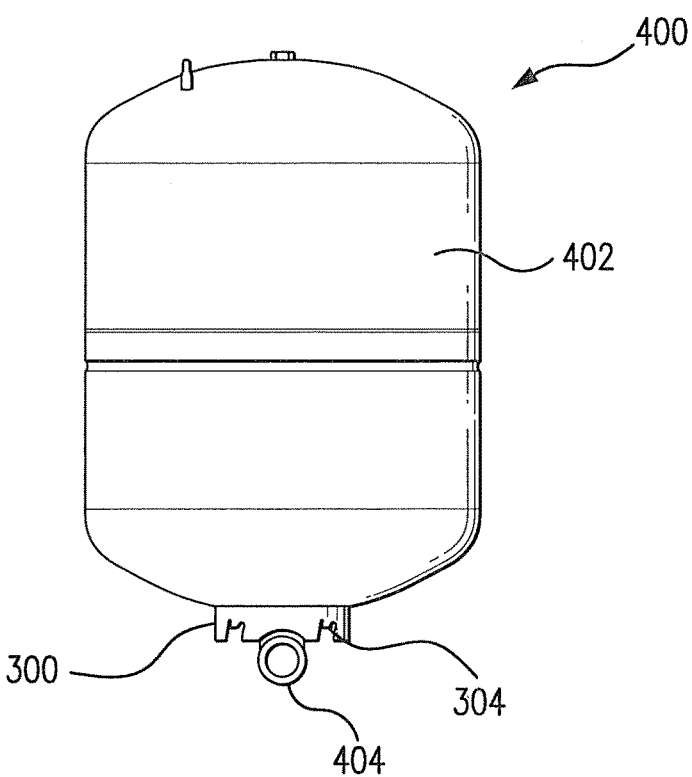
FIG. 2 is a side perspective view of an exemplary embodiment of a pressure vessel constructed in accordance with the present invention, showing the retaining ring mounted to the pressure vessel.
Figure 3:
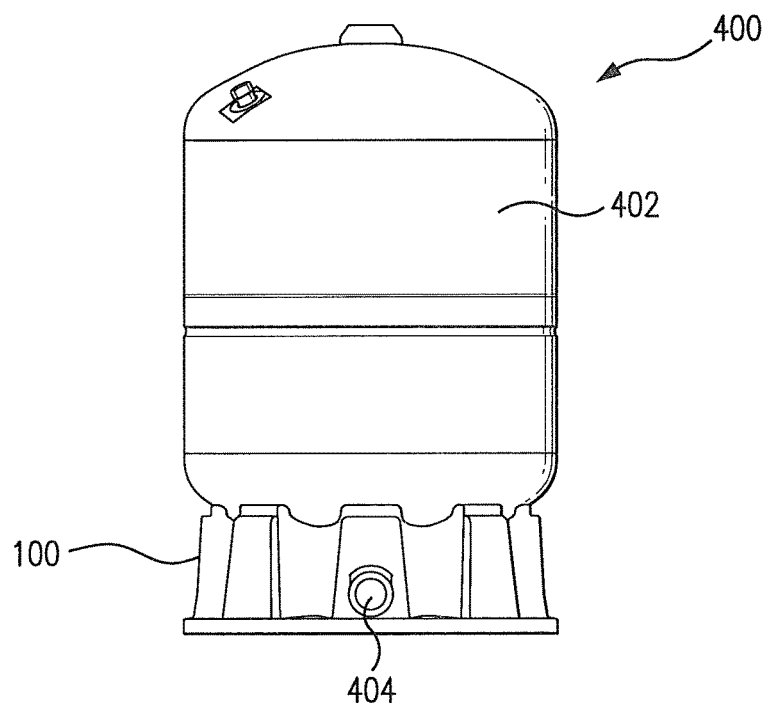
FIG. 3 is a side perspective view of the pressure vessel of FIG. 2, showing the pressure vessel coupled to the support stand of FIG. 1.
Figure 4:
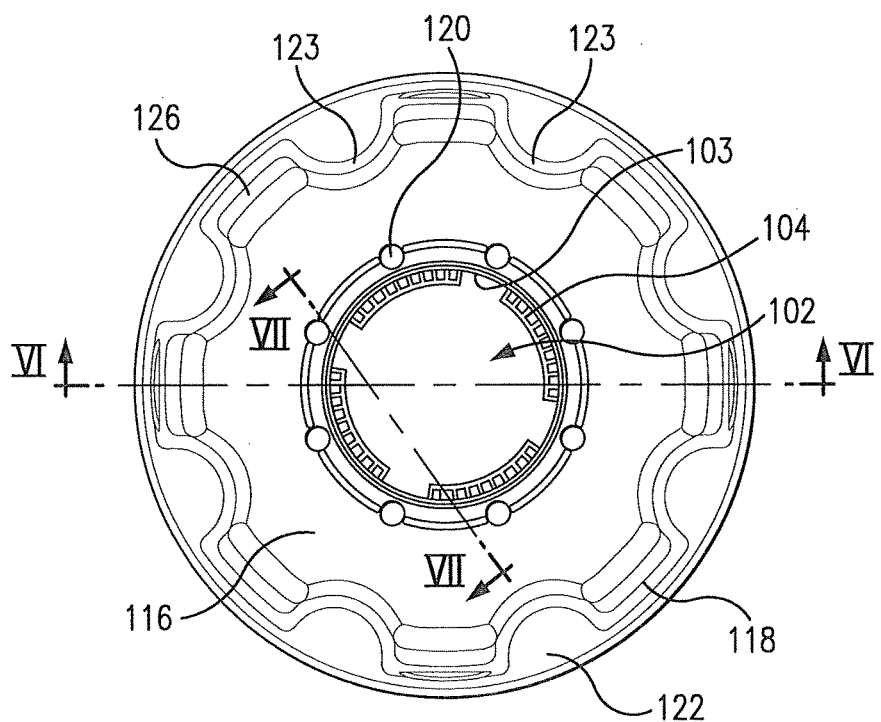
FIG. 4 is a top plan view of the support stand of FIG. 1, showing the locking latches and drainage apertures.

Referring now to FIGS. 2-3, pressure vessel 400 includes vessel body 402 defining an interior space for containing fluid and retaining ring 300 mounted to vessel body 402. As shown in FIG. 2, elbow connector 404 is connected to one end of vessel body 402 to provide a fluid conduit to the interior space of vessel body 402. Retaining ring 300 is mounted to the end of vessel body 402 by welding, or any other suitable attachment method depending on the materials used to construct vessel body 402 and retaining ring 300. As shown in FIG. 3, stand 100 is attached to pressure vessel 400 to keep pressure vessel 400 upright and elevated above the ground to reduce/prevent corrosion.

Figure 5:
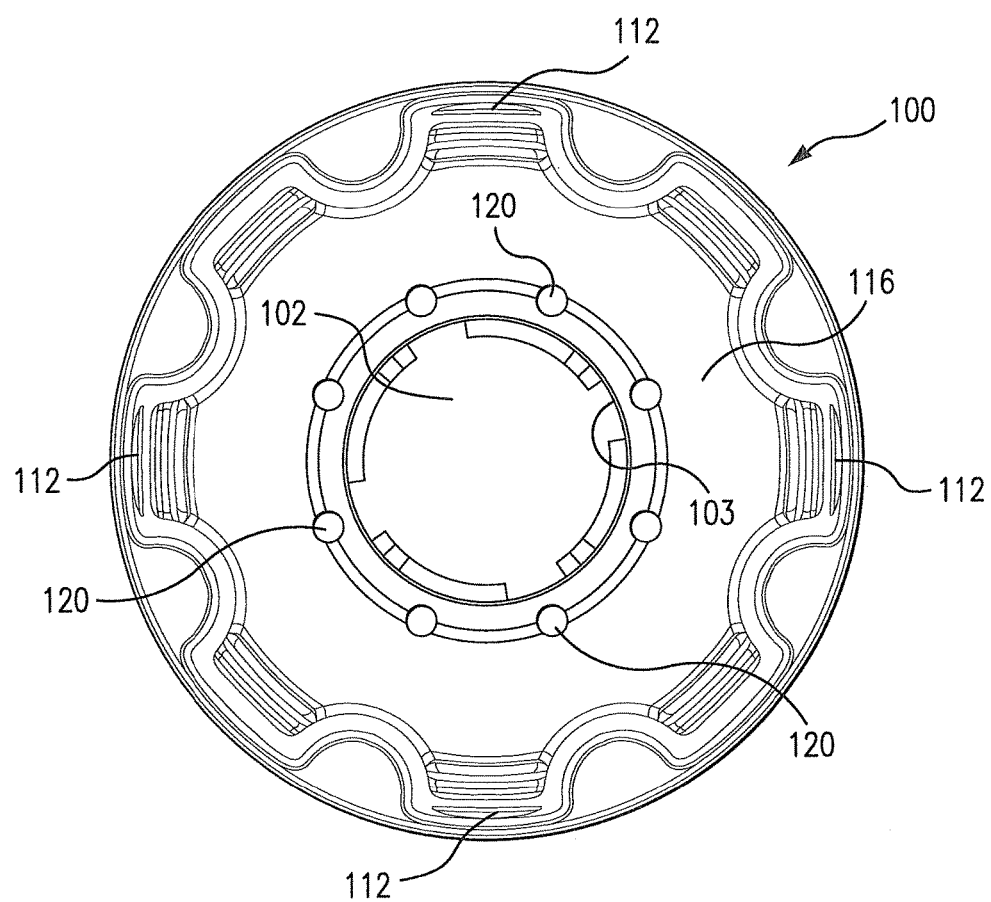
FIG. 5 is a bottom plan view of the support stand of FIG. 1, showing the support stand without stiffening ribs.
Figure 6:
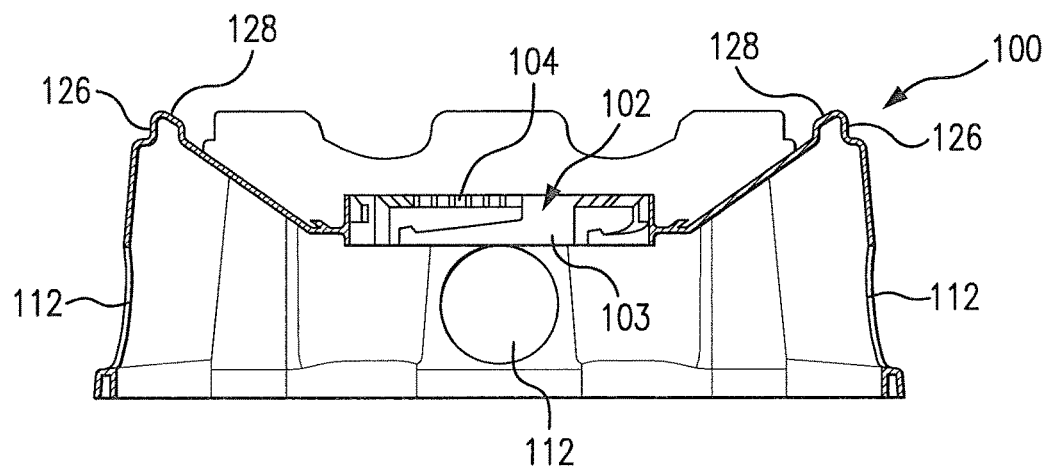
FIG. 6 is a cross-sectional side elevation view of the support stand of FIG. 1 taken along line VI-VI of FIG. 4, showing the locking latches in the locking aperture.
Figure 7:
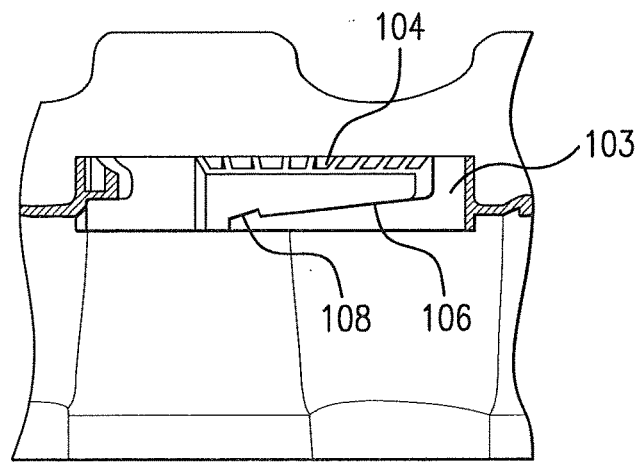
FIG. 7 is a cross-sectional side elevation view of a portion of the support stand of FIG. 1 taken along line VII-VII of FIG. 4, showing the ramp and detent of the locking latch.
Figure 8:
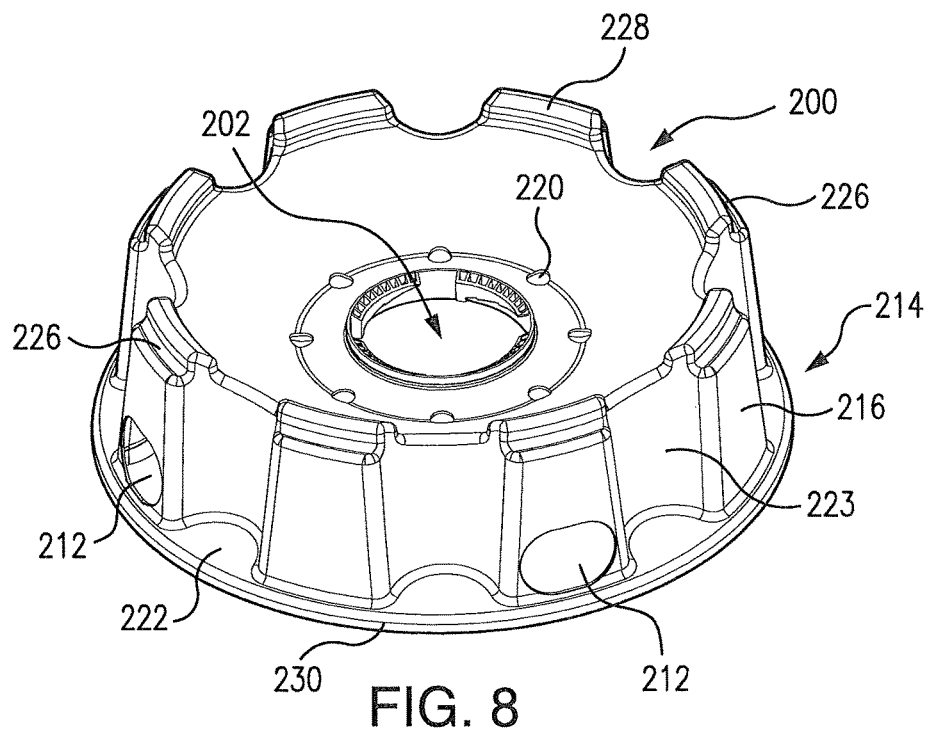
FIG. 8 is a perspective view of another exemplary embodiment of a support stand constructed in accordance with the present invention, showing the locking latches with multiple detents.
Figure 9:
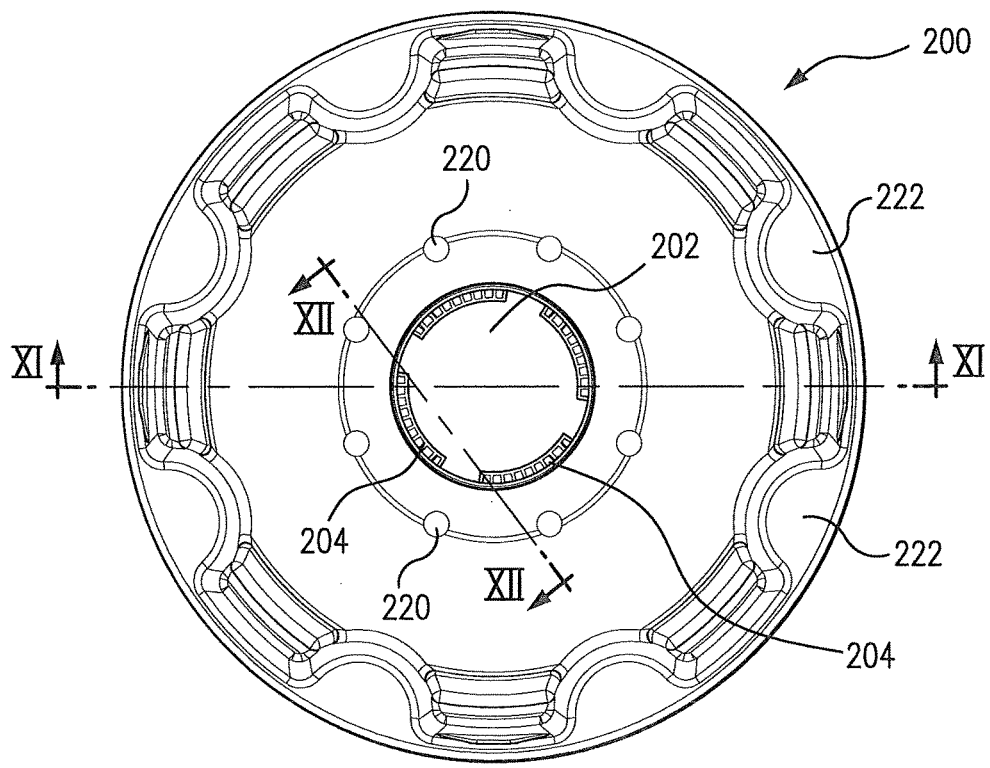
FIG. 9 is a top plan view of the support stand of FIG. 8, showing the locking latches and drainage apertures.
Figure 10:
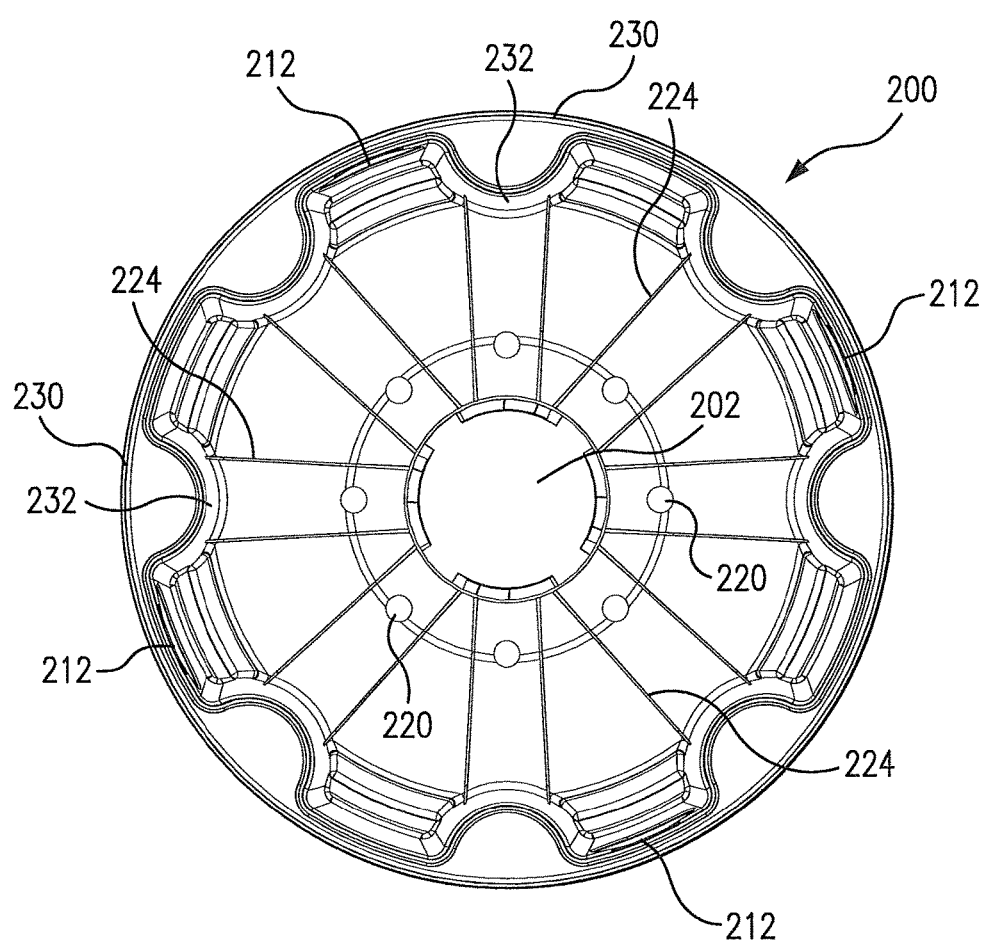
FIG. 10 is a bottom plan view of the support stand of FIG. 8, showing the stiffening ribs.

Referring now to FIGS. 4-7, a plurality of locking latches 104 is disposed along inner dimension 103 of locking aperture 102. The locking latches 104 are configured and adapted to couple with pressure vessel retaining ring 300 passing through the locking aperture 102. Each of locking latches 104 are arcuately shaped to allow for rotational engagement with retaining ring 300 as shown in FIG. 5. The lower surface of each locking latch 104 are helical for engaging a pressure vessel by twisting as shown in FIG. 6. In an exemplary embodiment, locking latches 104 are formed with ramp 106 and detent 108, as shown in FIG. 7. Detent 108 is configured and adapted to engage corresponding retaining ring tab 304 when support stand 100 is twisted into place onto pressure vessel 400, as described in greater detail below.

Figure 11:
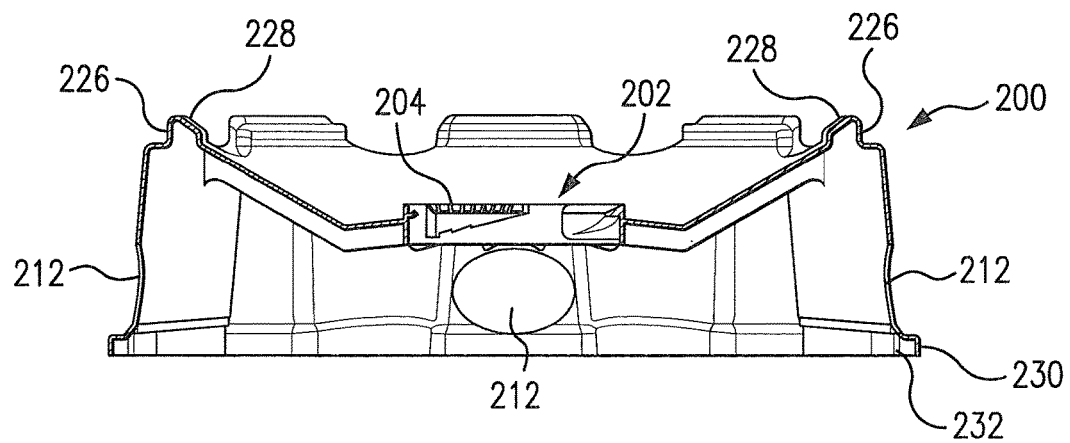
FIG. 11 is a cross-sectional side elevation view of the support stand of FIG. 8 taken along line XI-XI of FIG. 9, showing the locking latches in the locking aperture.
Figure 12:
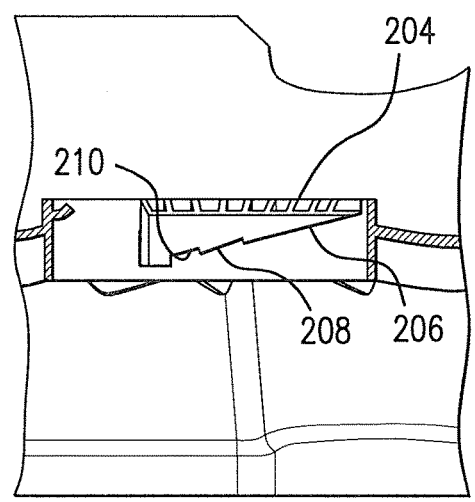
FIG. 12 is a cross-sectional side elevation view of the support stand of FIG. 8 taken along line XII-XII of FIG. 9, showing the two detents of the locking latch.

Referring now to FIGS. 8-12, another exemplary embodiment of a support stand 200 is shown in which locking latches 204 include a plurality of locking detents 208, 210 to lockingly couple support body 214 to pressure vessels (e.g. pressure vessel 400 described above) of multiple different shapes. First locking latch detent 208 is configured to engage corresponding retaining ring tab 304 for a relatively large diameter dome shaped pressure vessel 400 (e.g. a twenty-six inch diameter vessel) while second locking latch detent 210 is configured to engage corresponding retaining ring tab 304 of at least a relatively small diameter dome shaped pressure vessel 400, for example a twenty-two inch diameter vessel. First and second locking latch detents 208, 210, as shown in FIGS. 11 and 12, provide different engagement depths for retaining ring tab 304 due to different dome shapes of pressure vessels which change the required vertical height and location of locking latches 204 relative to retaining ring 300. The differing engagement depth allows stand 200 to provide predetermined preload biasing of stand 200 to correspond to particular pressure vessels of multiple different shapes. Stiffening ribs 224

Referring now to FIGS. 13-15, retaining ring 300 has a plurality of retaining ring tabs 304 extending radially outward to engage with a corresponding locking latch 104, 204. In an exemplary embodiment, retaining ring 300 is formed out of a metal sheet, for example, with a profile as shown in FIG. 15 prior to being formed into a ring with tabs. By engaging key 308 to slot 306, a ring shape is formed which can then be attached, e.g. by welding, to the end of pressure vessel 400 as shown in FIG. 14. Retaining ring tabs 304 are bent to extend radially outward from retaining ring body 302. Depending on the size of pressure vessel 400, the dimensions of the retaining ring profile are adjusted accordingly. Locking latches 104, 204 each are adapted to rotatably engage a respective radially outward extending retaining ring tab 304 as described below.

Figure 16A:
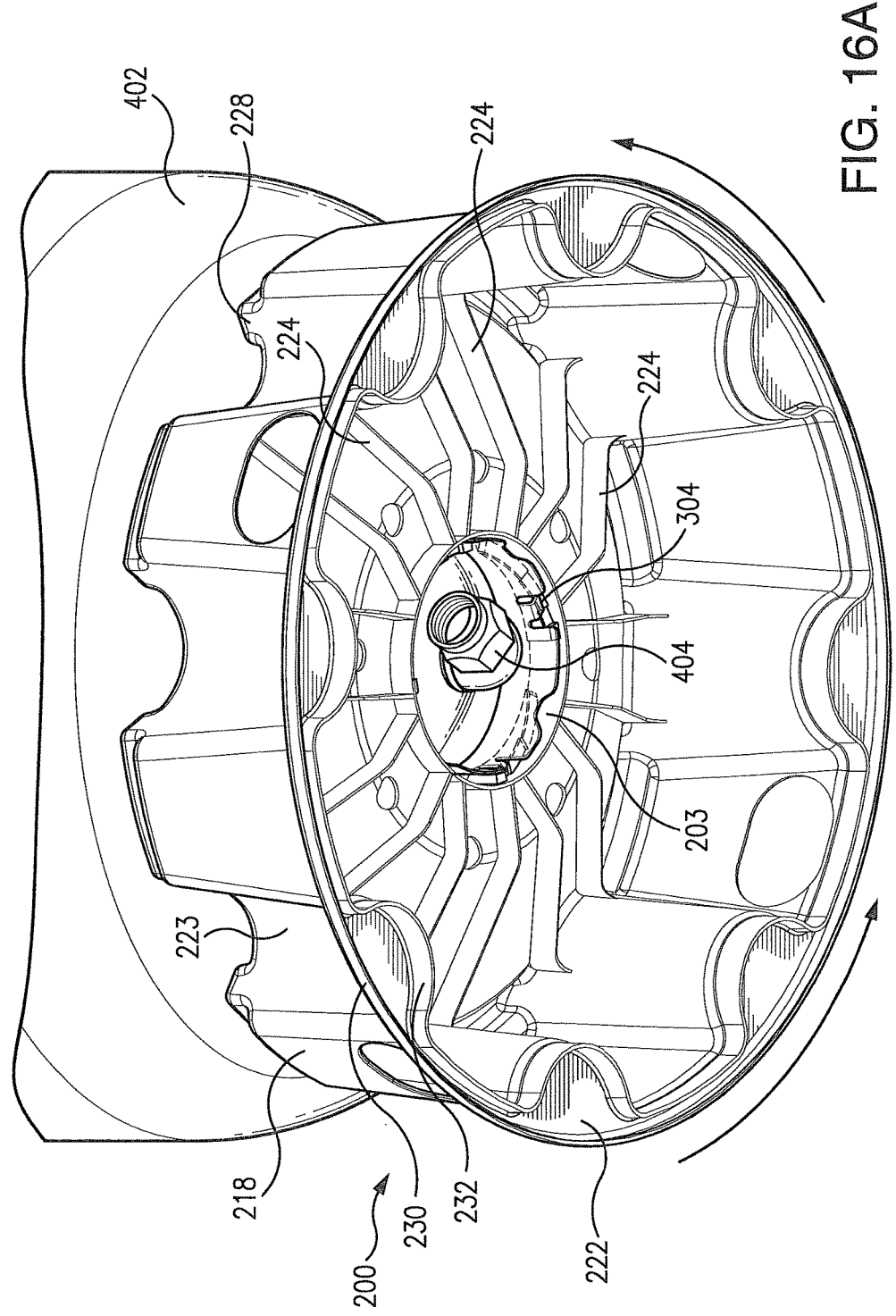
FIG. 16a is a bottom perspective view of the support stand and a portion of the pressure vessel of FIG. 8, showing the retaining ring tabs engaging with the ramps of the locking latches of the support stand before seating in the respective detents.
Figure 16B:
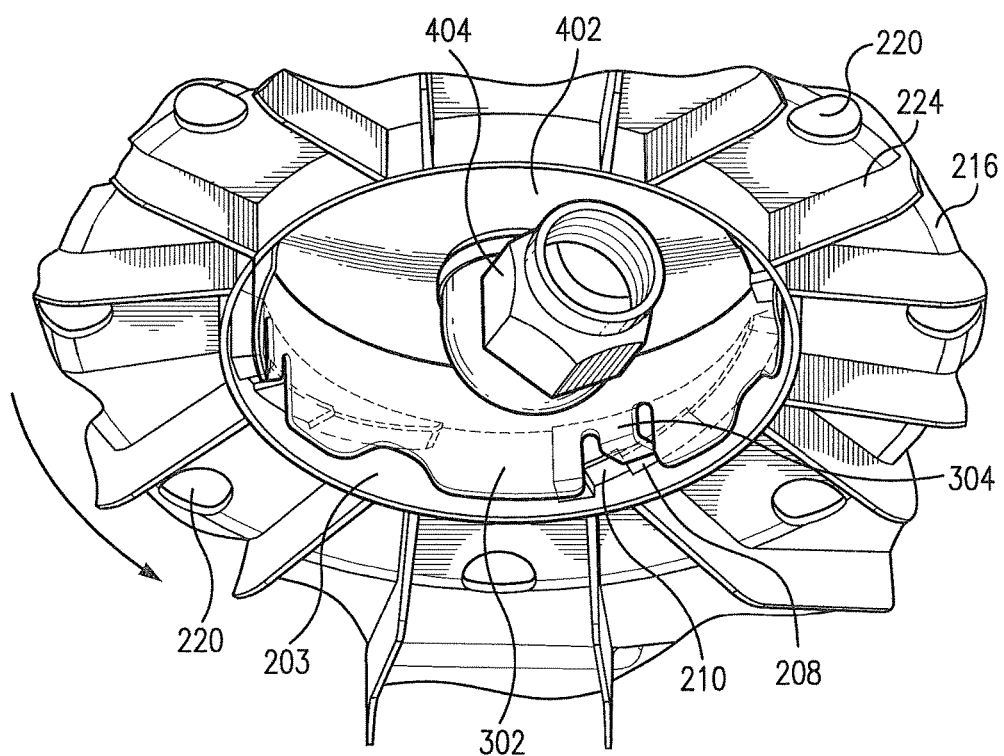
FIG. 16b is a bottom perspective view of portions of the support stand and pressure vessel of FIG. 16a, showing the retaining ring partially seated to the support stand.
Figure 17:
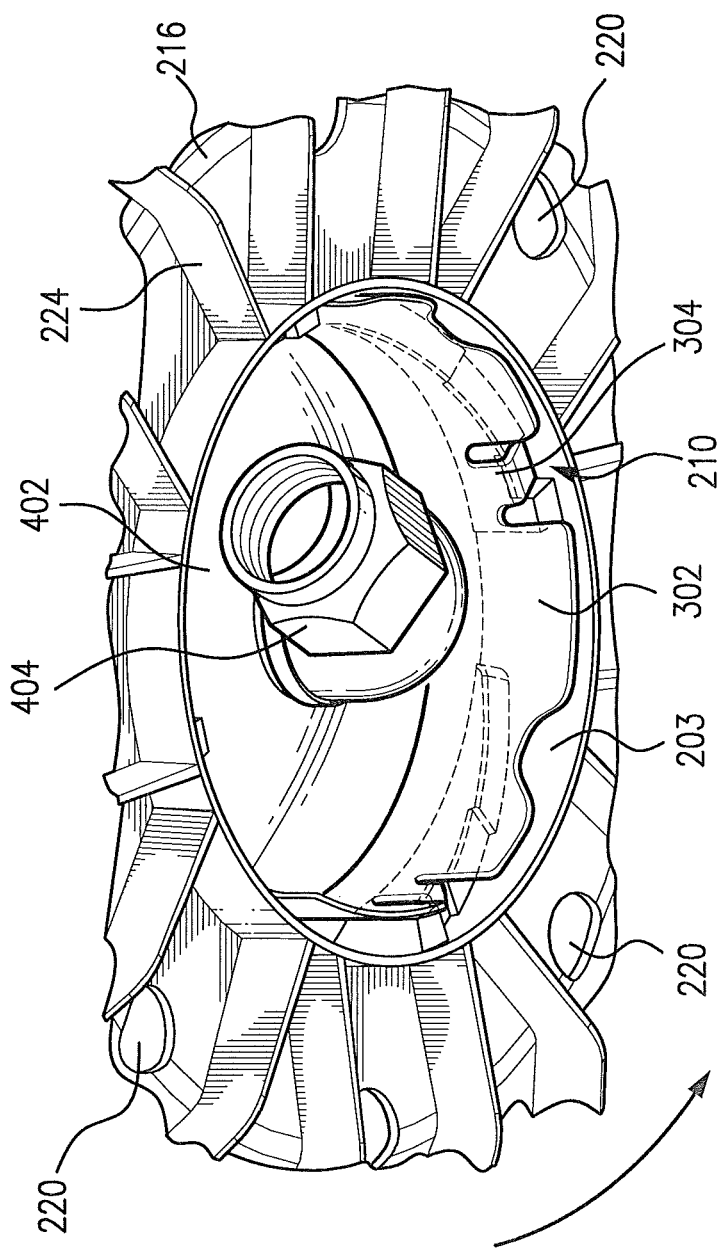
FIG. 17 is a bottom perspective view of portions of the support stand and pressure vessel of FIG. 16a, showing the retaining ring fully seated to the support stand.

Referring to FIGS. 16a, 16b, in operation, stand 200 is connected to vessel body 402 and retaining ring 300 by inserting retaining ring 300 into locking aperture 202. Retaining ring tabs 304 each begin to engage with a corresponding locking latch ramp 206 of locking latches 204. By rotating stand 200 approximately one-quarter of a turn as measured from vessel body 402 as indicated in FIG. 16a with the rotation arrow, stand 200 is drawn tight against vessel body 402 by the engagement of locking latch ramps 206 with retaining ring tabs 304. Also as stand 200 is being rotated, upper wall 216 is biased in tension, providing a spring action locking the respective locking latches 204 against retaining ring tabs 304. Once stand 200 is rotated into the locked position, locking latch detents 210 each engage with corresponding retaining ring tabs 304 to allow upper wall 216 to partially return towards a resting, i.e. untensioned, position. The distortion of upper wall 216 in combination with engagement of retaining ring tabs 304 and locking latch detents 210 thereby applies a preload force against vessel body 402 and locks support stand 200 to vessel body 402 to prevent movement of stand 200 relative to vessel body 402. To provide greater resistance to unlatching, retaining ring tabs 304 each can be bent at an angle, before engagement with stand 200, such that when vessel body 402 is locked to support stand 200, the preload force is increased. By using stand 200 a flatter dome shaped pressure vessel will lock to stand 200 using detent 208 (e.g. one click while twisting into place) while a more rounded dome shaped pressure vessel locks to support stand 200 using detent 210 (e.g. two clicks).

Stiffening ribs 124, 224 are disposed within support body 114, 214 below upper wall 116, 216 and inboard of sidewall 118, 218, radiating outwardly from the locking aperture 102, 202 for improving resistance of support body 114, 214 to applied forces, as shown in FIGS. 10, 16a, 16b and 17. Further, stiffening ribs 124, 224 are configured to assist upper wall 116, 216 in applying the desired preload force for locking. Also, stiffening ribs 124, 224 are designed to allow some flexibility in upper wall 116, 216 and stand 100, 200 in a radial direction. In this manner, stand 100, 200 and pressure vessel 400 are able to survive a vertical drop without damage to stand 100, 200 or pressure vessel 400 by flexing of stand 100, 200 and stiffening ribs 124, 224 to absorb energy rather than cracking or breaking.

In an exemplary embodiment, by using four locking latches 104, and four corresponding retaining ring tabs 304, when support stand 100, 200 is fully seated and locked to vessel body 402, elbow connector 404, or other suitable fluid conduit attached to vessel body 402, is lined up to any one of four access apertures 112 regardless of the initial position of stand 100, 200 with respect to vessel body 402. By ensuring that a fluid conduit (e.g. elbow connector 404) always lines up with access aperture 112 when vessel body 402 is locked to stand 100, 200, stand 100, 200 is able to be quickly and simply locked to vessel body 402.

In an exemplary embodiment, support stand 100, 200 is removable from retaining ring 300 by overcoming a predetermined locking preload force. Stand 100, 200 may be removed from pressure vessel 400 by depressing upper wall 116, overcoming the spring force of stand 100, 200 and disengaging retaining ring tabs 304 from the respective detent 108, 208, 210 which allows stand 100, 200 to be rotated in the reverse direction to disengage stand 100, 200 from retaining ring 300. Alternatively, retaining ring stabs 304 are mechanically distorted, crimped, staked, or the like, to locking latches 104 to provide permanent attachment of stand 100, 200 to vessel body 402.

Sidewall 118, 218 of support body 114, 214 are configured with circumferential periodic concave recesses 123, 223 for enhancing rigidity of support body 114, 214, as shown in FIGS. 1, 2, 4, 5, 8, 9, 10, 16a, 16b and 17. Concave recesses 123, 223 also provide for increased strength when rolling pressure vessel 400, such as when transporting along a floor. Sidewall 118, 218 includes periodic standoffs 128, 228 alternating with concave recesses 123, 223. Standoffs 128, 228 include outer circumferential recess 126, 226 for engaging a pressure vessel base such as when it is desired to stack a pressure vessel on support stand 100, 200 without locking engagement. The inside diameter of such an integral pressure vessel base can mate with the outer diameter of outer circumferential recess 126, 226, for example. Mating with outer circumferential recess 126, 226 allows an integral pressure vessel base to be elevated off of the ground to minimize corrosion and exposure to standing water.

In certain embodiments, upper wall 116, 216 of support stand 100, 200 further includes a plurality of drainage apertures 120, 220 defined therethrough, as shown in FIGS. 1, 4, 5, 8, 9, 10, 16a, and 16b. Drainage apertures 120, 220 are configured and adapted to permit airflow and drainage of liquid through upper wall 116, 216 of support stand 100, 200. The periodic arrangement of standoffs 128, 228 with concave recesses 123, 223 facilitate air circulation below the underside of pressure vessel 400. This air circulation can help to prevent buildup of condensation on the outside of pressure vessel 400 that may collect from ambient humidity where this condensation may degrade the protection provided by a coating on pressure vessel 400.

Support stand 100, 200 can include lower wall 122, 222 extending outward from a lower end of sidewall 118, 218, to present a flat contact surface with the ground to prevent sinking of support stand 100, 200. Further, lip 128, 228 in combination with edge 130, 230 each extending from lower wall 122, 222 can be used to stiffen lower wall 122, 222 as well increase the ground footprint in order to provide a firmer, more stable support of the stand on the ground.

The methods and systems of the present invention, as described above and shown in the drawings, provide for a support stand with superior properties including resistance to corrosion and ease of manufacturing a support stand with simplicity of coupling to a pressure vessel. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A stand for supporting a pressure vessel, the stand comprising:
   a support body having an upper wall and a sidewall extending downwardly from the upper wall;
   a single locking aperture defined in the upper wall to permit passage of pressure vessel components through the upper wall; and
   a plurality of locking latches disposed along an inner dimension of the single locking aperture, the plurality of locking latches configured to couple with a pressure vessel retaining ring passing through the locking aperture, wherein a lower surface of each locking latch is helical relative to the inner dimension of the single locking aperture for engaging with a pressure vessel by twisting.

2. The stand of claim 1, wherein at least one of the locking latches further includes a helical locking detent recessed relative to the lower surface to lockingly couple the support body to pressure vessels of multiple different shapes.

3. The stand of claim 1, wherein the upper wall is configured to bias the plurality of locking latches in a locked position when engaged with a pressure vessel retaining ring.

4. The stand of claim 1, wherein each of the plurality of locking latches are arcuately shaped.

5. The stand of claim 1, wherein the upper wall further comprises a plurality of drainage apertures defined therethrough to permit airflow and drainage through the upper wall.

6. The stand of claim 1, further comprising at least one access aperture defined in the sidewall to permit a fluid conduit to pass through the sidewall.

7. The stand of claim 1, further comprising a lower wall extending outward from a lower end of the sidewall to present a flat contact surface with the ground to prevent sinking of the stand.

8. The stand of claim 1, wherein a plurality of stiffening ribs are disposed within the support body below the upper wall and inboard of the sidewall, the stiffening ribs radiating outwardly from the locking aperture for improving resistance of the support body to applied forces.

9. The stand of claim 1, wherein an upper portion of the sidewall includes an outer circumferential recess for engaging a pressure vessel base.

10. A pressure vessel comprising:
   a vessel body defining an interior space for containing fluid;
   a retaining ring mounted to the vessel body; and
   a stand for supporting the vessel body, the stand including:
      a support body having an upper wall and a sidewall extending downwardly from the upper wall;
      a single locking aperture defined in the upper wall to permit passage of pressure vessel components therethrough; and
      a plurality of locking latches disposed along an inner dimension of the single locking aperture, the plurality of locking latches coupled with the retaining ring passing through the locking aperture, wherein a lower surface of each locking latch is helical relative to the inner dimension of the single locking aperture for engaging with the retaining ring by twisting.

11. The pressure vessel of claim 10, wherein the retaining ring has a plurality of tabs extending radially outward, each tab configured to engage with a corresponding locking latch.

12. The pressure vessel of claim 10, wherein the locking latches each are adapted to rotatably engage a respective radially outward extending tab of the retaining ring.

13. The pressure vessel of claim 10, wherein the support body is coupled with the vessel body by radially outward extended tabs on the retaining ring, the tabs each being locked in a helical detent in a respective locking latch.

14. The pressure vessel of claim 10, wherein the sidewall of the support body is configured with circumferential periodic concave recesses for enhancing rigidity of the support body.

15. The pressure vessel of claim 10, wherein the support body is removable from the retaining ring by overcoming a predetermined locking preload force.

16. The pressure vessel of claim 10, wherein a plurality of stiffening ribs are disposed within the support body below the upper wall and inboard of the sidewall, the stiffening ribs radiating outwardly from the locking aperture for improving resistance of the support body to applied forces.

17. The pressure vessel of claim 10, wherein the upper wall is configured to bias the plurality of locking latches in a locked position when engaged with the pressure vessel retaining ring.

18. The pressure vessel of claim 10, wherein at least one of the locking latches further includes a plurality of locking detents to lockingly couple the support body to pressure vessels of multiple shapes.

19. The pressure vessel of claim 10, wherein the retaining ring has a plurality of tabs extending radially outward, each tab including a helical surface to engage with a corresponding locking latch.

20. A pressure vessel comprising:
   a vessel body, the vessel body defining an interior space for containing fluid;
   a retaining ring connected to the vessel body, the retaining ring having a plurality of tabs extending radially outward from the ring; and
   a stand for supporting the vessel body, the stand including:
      a support body having an upper wall and a sidewall extending downwardly from the upper wall;
      a single locking aperture defined in the upper wall to permit passage of pressure vessel components therethrough; and
      a plurality of locking latches disposed along an inner dimension of the single locking aperture, each locking latch configured to rotatably engage with a respective retaining ring tab to couple the vessel body to the support body, wherein a lower surface of each locking latch is helical relative to the inner dimension of the single locking aperture for engaging with the retaining ring by twisting, wherein the upper wall is configured to bias against the vessel body which biases the retaining ring tabs against the locking latches for locking.

* * * * *